(12) United States Patent
Nakahara

(10) Patent No.: US 8,169,530 B2
(45) Date of Patent: May 1, 2012

(54) CAMERA HAVING AN AUTOFOCUSING SYSTEM

(75) Inventor: Naoto Nakahara, Saitama (JP)

(73) Assignee: Pentax Ricoh Imaging Company, Tokyo (JP)

( * ) Notice: Subject to any disclaimer, the term of this patent is extended or adjusted under 35 U.S.C. 154(b) by 885 days.

(21) Appl. No.: 12/135,429

(22) Filed: Jun. 9, 2008

(65) Prior Publication Data

US 2008/0316325 A1    Dec. 25, 2008

(30) Foreign Application Priority Data

Jun. 19, 2007 (JP) ................... 2007-161411

(51) Int. Cl.
    *H04N 5/232* (2006.01)
(52) U.S. Cl. ........................ 348/345; 348/347
(58) Field of Classification Search .................. None
    See application file for complete search history.

(56) References Cited

U.S. PATENT DOCUMENTS

| | | | |
|---|---|---|---|
| 6,928,241 B2 | 8/2005 | Hirai | |
| 7,242,434 B2 | 7/2007 | Sugimoto et al. | |
| 7,660,519 B2 | 2/2010 | Iwane et al. | |
| 7,791,668 B2 | 9/2010 | Maeda | |
| 7,821,568 B2 | 10/2010 | Sugimoto et al. | |
| 7,844,175 B2 * | 11/2010 | Gotanda | 396/123 |
| 2001/0010556 A1 | 8/2001 | Sugimoto et al. | |
| 2004/0052514 A1 | 3/2004 | Hirai | |
| 2004/0202461 A1 | 10/2004 | Nakahara | |
| 2004/0207743 A1 * | 10/2004 | Nozaki et al. | 348/333.12 |
| 2006/0012702 A1 * | 1/2006 | Kawahara et al. | 348/345 |
| 2006/0120711 A1 | 6/2006 | Nakata | |
| 2007/0030381 A1 * | 2/2007 | Maeda | 348/345 |
| 2007/0047941 A1 * | 3/2007 | Iwane et al. | 396/123 |
| 2007/0070238 A1 | 3/2007 | Sugimoto et al. | |
| 2007/0071434 A1 | 3/2007 | Kawanami | |
| 2007/0140676 A1 | 6/2007 | Nakahara | |
| 2007/0188644 A1 * | 8/2007 | Okamoto | 348/333.01 |
| 2008/0055457 A1 | 3/2008 | Nakahara | |
| 2008/0143866 A1 | 6/2008 | Nakahara | |

FOREIGN PATENT DOCUMENTS

JP          2000-147368 A          5/2000

(Continued)

OTHER PUBLICATIONS

English language Abstract of JP 2002-311325, Oct. 23, 2002.

(Continued)

*Primary Examiner* — Luong T Nguyen
(74) *Attorney, Agent, or Firm* — Greenblum & Bernstein, P.L.C.

(57) ABSTRACT

An autofocus camera having a face recognition function, includes a photographing optical system including a focusing lens group; an image pickup device; an autofocusing system which performs a focus search process, and further performs a focusing operation in which the focusing lens group is moved to an in-focus position that is detected by the focus search process; a switch which activates the autofocusing system; a face recognition device for recognizing a face image based on object images; and a controller which makes the autofocusing system set the focus detection area on a face recognition area at which the face image is recognized and makes the autofocusing system perform the focus search process and the focusing operation on the focus detection area regardless of whether the switch is turned ON when the face recognition device recognizes the face image.

20 Claims, 8 Drawing Sheets

FOREIGN PATENT DOCUMENTS

| | | |
|---|---|---|
| JP | 2001-208959 A | 8/2001 |
| JP | 2002-72074 | 3/2002 |
| JP | 2002-311325 | 10/2002 |
| JP | 2004-102135 | 4/2004 |
| JP | 2004-102135 A | 4/2004 |
| JP | 2004-317699 A | 11/2004 |
| JP | 2006-33440 | 2/2006 |
| JP | 2006-201282 A | 8/2006 |
| JP | 2006-208558 | 8/2006 |
| JP | 2006-208558 A | 8/2006 |
| JP | 2006-319596 A | 11/2006 |
| JP | 2007-65290 | 3/2007 |
| JP | 2007-81991 | 3/2007 |

OTHER PUBLICATIONS

English language Abstract of JP 2002-72074, Mar. 12, 2002.
Japanese Office Action dated Mar. 22, 2011 and English language translation.
Japanese Office Action dated Mar. 23, 2011.
English translation of Japanese Office action, dated May 10, 2011.

* cited by examiner

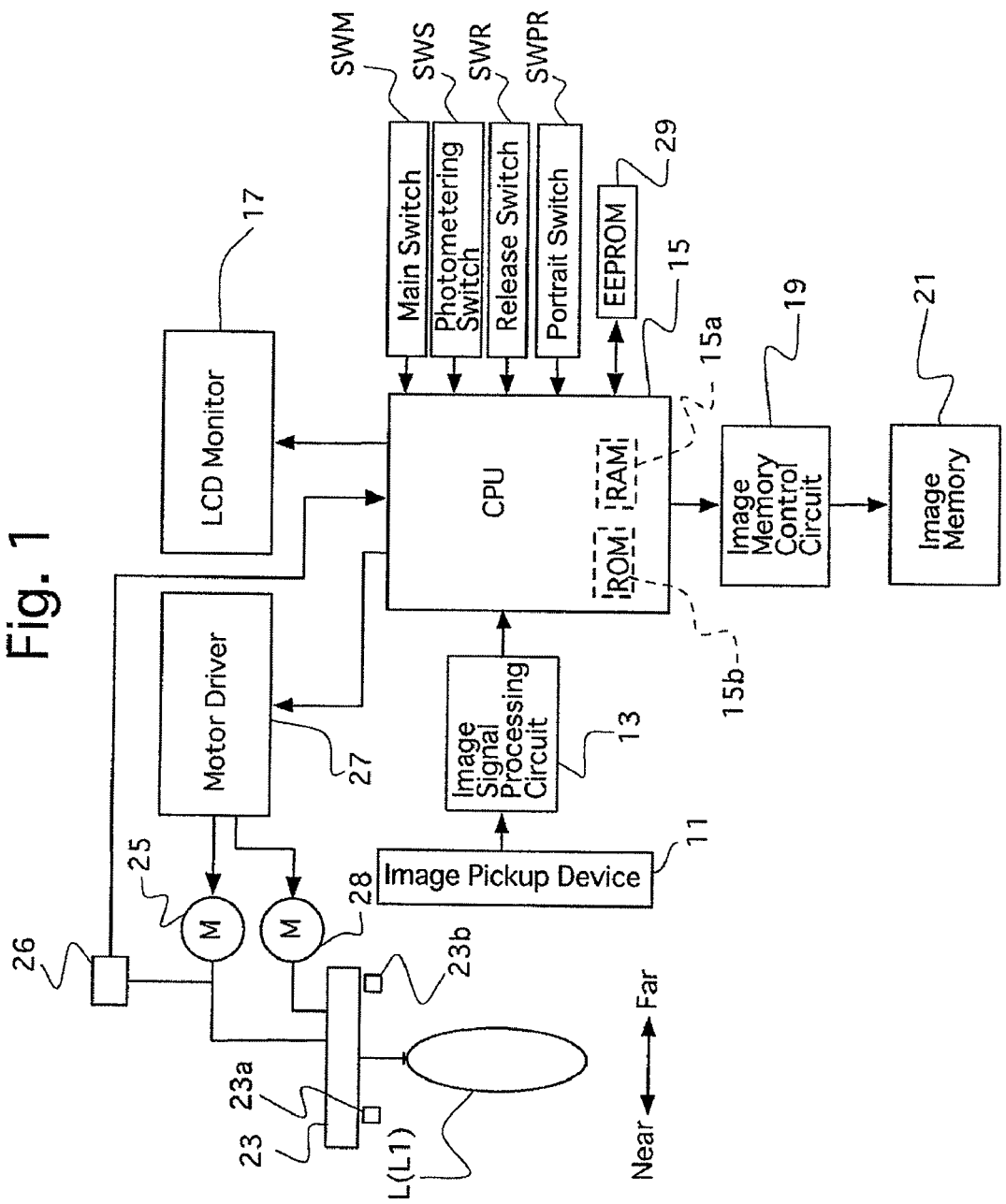

[Multi-Point Distance Measuring Mode]

[Spot Distance Measuring Mode]

Short-Distance — Far-Extremity

Short-Distance — Far-Extremity

PN
PN+n
PN−n

CAMERA HAVING AN AUTOFOCUSING SYSTEM

BACKGROUND OF THE INVENTION

1. Field of the Invention

The present invention relates to a camera having an autofocusing system which performs a focusing operation in accordance with a face recognition result.

2. Description of the Prior Art

Conventional so-called compact digital cameras with a contrast-detection focus adjusting system (focusing system) which detects a focus state (in-focus position) by performing a focus search process are known in the art. In the focus search process, images are captured consecutively at different positions of a focusing lens group while the focusing lens group is moved stepwise from a search start position, which is one of the closest (shortest) focus position (near extremity/position for bringing an object at the shortest distance in working range into focus) and the infinite focus position (far extremity/position for bringing an object at infinity into focus), to a search end position (the other of the infinite focus position and the closest focus position) to detect a focus state based on contrasts of the captured images. This type of compact digital camera is disclosed in Japanese Unexamined Patent Publication No. 2002-311325. Additionally, in recent years, a type of autofocusing system having a face recognition function is known in the art. This function recognizes one or more faces (human faces) from captured images and brings the faces into focus. This type of autofocusing system is disclosed in Japanese unexamined patent publication No. 2002-072074.

In the aforementioned type of conventional digital camera which incorporates this face-recognition autofocusing system, an autofocusing process and a face recognition process are performed upon the release button of the camera being depressed half way, and an imaging process (image capturing process) and an image storing process are performed upon the release button of the camera being fully depressed. It is sometimes the case that the user who is not accustomed to controlling cameras or who focuses their attention on a human face to take a picture of his/her facial expression tends to depress the release button in a single stroke upon determination of composition. In the case where the release button is fully depressed at a single stroke in this manner, it is often the case that the user misses the photo opportunity at the right moment because the autofocusing process and the face recognition process are performed from the outset, thus taking time until the autofocusing process and the face recognition process are completed.

SUMMARY OF THE INVENTION

The present invention has been devised in view of the above described drawbacks of conventional compact digital cameras having a face recognition function, and provides a camera having an autofocusing system wherein the time required for the autofocusing operation when the face recognition function is activated can be reduced.

According to an aspect of the present invention, an autofocus camera having a face recognition function is provided, including a photographing optical system including a focusing lens group movable along an optical axis; an image pickup device; an autofocusing system which performs a focus search process in which the image pickup device is activated to capture an object image at each of a plurality of different positions of the focusing lens group in the optical axis direction while the focusing lens group is moved along the optical axis to detect a position of the focusing lens group in the optical axis direction as an in-focus position based on the object images obtained at the plurality of different positions of the focusing lens group in at least one focus detection area, and further performs a focusing operation in which the focusing lens group is moved to the in-focus position that is detected by the focus search process; a switch which activates the autofocusing system upon being turned ON; a face recognition device for recognizing a face image based on the object images; and a controller which makes the autofocusing system set the focus detection area on a face recognition area at which the face image is recognized by the face recognition device and makes the autofocusing system perform the focus search process and the focusing operation on the focus detection area regardless of whether the switch is turned ON when the face recognition device recognizes the face image.

It is desirable for the controller to make the autofocusing system set the focus detection area on the face recognition area and makes the autofocusing system perform the focus search process and the focusing operation on the focus detection area regardless of whether the switch is turned ON one of upon a lapse of a predetermined period of time after the face recognition device recognizes the face image and upon the face recognition device recognizing the face image consecutively a predetermined number of times.

It is desirable for the autofocus camera to include a portrait mode as one of selectable exposure modes of the autofocus camera, wherein, after the portrait mode is selected, the controller makes the autofocusing system set the focus detection area on the face recognition area and makes the autofocusing system perform the focus search process and the focusing operation on the focus detection area regardless of whether the switch is turned ON one of upon a lapse of a predetermined period of time after the face recognition device recognizes the face image and upon the face recognition device recognizing the face image consecutively a predetermined number of times.

It is desirable for the controller to limit a range of movement of the focusing lens group in the focus search process from one to the other of a near extremity and a far extremity to a narrow range including a current position of the focusing lens group upon the switch being turned ON after the autofocusing system performs the focus search process and the focusing operation following recognition of the face image by the face recognition device.

It is desirable for the controller not to limit the range of movement of the focusing lens group in the focus search process to the narrow range when the autofocusing system performs the focus search process and the focusing operation following the recognition of the face image by the face recognition device.

In the case where the focusing lens group has not been previously moved to the in-focus position when the switch is turned ON, it is desirable for the controller not to limit the range of movement of the focusing lens group in the focus search process to the narrow range.

In the case where the face recognition device has not previously recognized the face image when the switch is turned ON, it is desirable for the controller not to limit the range of movement of the focusing lens group in the focus search process to the narrow range.

It is desirable for the autofocus camera to include a memory in which image data on the object image that is captured by the image pickup device is stored. The controller stores the image data in the memory immediately after the autofocusing system moves the focusing lens group to the in-focus position following the recognition of the face image by the face recognition device. Upon the switch being turned ON afterwards, the controller compares the image data currently captured by the image pickup device with the image data stored in the memory and does not limit the range of movement of the focusing lens group in the focus search process to the narrow range if a degree of matching between the current image data and the image data stored in the memory is lower than a predetermined degree.

It is desirable for the image data, which is stored in the memory, to include the pattern of an entire image based on the image data, and for the controller to compare the pattern of the entire image based on the image data currently captured by the image pickup device with the pattern of the entire image stored in the memory.

It is desirable for the controller not to limit the range of movement of the focusing lens group in the focus search process to the narrow range if the number of face images recognized by the face recognition device is unequal to that recognized before the switch is turned ON when the switch is turned ON.

It is desirable for the controller not to limit the range of movement of the focusing lens group in the focus search process to the narrow range if a difference between a current object brightness and an object brightness at a time when the autofocusing system operates last time is greater than a predetermined value when the switch is operated.

It is desirable for the controller not to limit the range of movement of the focusing lens group in the focus search process to the narrow range if a central position of the face image recognized by the face recognition device upon the switch being turned ON is within a predetermined range with a center thereof coincident with a central position of a current face image recognized by the face recognition device.

It is desirable for the autofocus camera to include a second switch which is turned ON after the switch is turned ON, wherein, upon the second switch being turned ON, the image pickup device is activated to capture the object image at each of the plurality of different positions of the focusing lens group, and image data on the object images thus captured is stored in an image memory.

It is desirable for the switch to be turned ON upon a release button of the autofocus camera being depressed half way.

It is desirable for the switch and the second switch to be turned ON upon a release button of the autofocus camera being depressed half way and fully depressed, respectively.

It is desirable for the focusing lens group to be moved along the optical axis from one to the other of a near extremity and a far extremity in the focus search process.

According to the present invention, upon recognizing a face image, the autofocusing system performs the focus search process and the focusing operation on this face image even if the switch (first switch) is not operated, and accordingly, the face image can be brought into focus in a short period of time upon the first switch being operated afterwards.

The present disclosure relates to subject matter contained in Japanese Patent Application No. 2007-161411 (filed on Jun. 19, 2007) which is expressly incorporated herein by reference in its entirety.

BRIEF DESCRIPTION OF THE DRAWINGS

The present invention will be discussed below in detail with reference to the accompanying drawings, in which:

FIG. 1 is a block diagram of elements of an embodiment of a digital camera to which a focus detection method according to the present invention is applied, showing a primary configuration of the digital camera;

FIGS. 2A, 2B, 2C and 2D are graphs each showing movements of the focusing lens group of the digital camera and contrast values in a contrast AF process, wherein FIG. 2A shows an example when the focusing lens group is positioned in the vicinity of the infinite focus position in a multi-point distance measuring mode, FIG. 2B shows an example when the focusing lens group is positioned in the vicinity of the closest focus position in the multi-point distance measuring mode, FIG. 2C shows an example when the focusing lens group is positioned in the vicinity of the infinite focus position in a spot distance measuring mode, and FIG. 2D shows an example when the focusing lens group is positioned in the vicinity of the closest focus position in the spot distance measuring mode;

FIGS. 3A and 3B are graphs showing movements of the focusing lens group of the digital camera and contrast values in the contrast AF process in a partial AF mode, wherein FIG. 3A shows an example when focus is achieved by a focus search process (normal focus search process) and FIG. 3B shows an example when focus is achieved by a partial focus search process performed after focus is once achieved by the normal focus search process;

FIGS. 4A and 4B are illustrations showing a manner of setting a focus detection area following recognition of a face image in a portrait mode, wherein FIG. 4A shows a state where the face image is recognized for the first time and FIG. 4B shows a state where the face image increases in size on a monitor subsequent to the state shown in FIG. 4A;

FIGS. 5A and 5B are illustrations showing a manner of setting a focus detection area following recognition of a face image in a portrait mode, wherein FIG. 5A shows a state where the face image is recognized for the first time and FIG. 5B shows a state where another face image enters the picture subsequent to the state shown in FIG. 5A;

DESCRIPTION OF THE PREFERRED EMBODIMENT

Figure 2A:
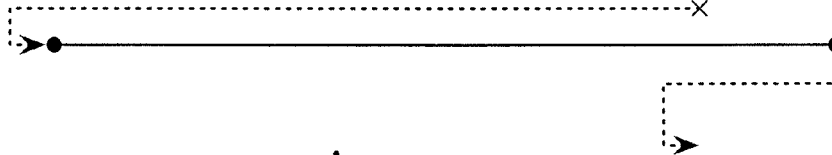

FIG. 1 is a block diagram of elements of an embodiment of a so-called compact digital camera having a contrast detection type of autofocusing system to which the present invention is applied, showing a basic configuration of the digital camera.

This digital camera is provided with a zoom lens (photographing optical system) L including a focusing lens group L1, and an image pickup device (CCD image sensor) 11 serving as an imaging device. An object image is formed on a light-receiving surface (picture plane) of the image pickup device 11 via the zoom lens L. The image pickup device 11 includes a large number of pixels (photoelectric transducing elements) arranged in a two-dimensional matrix at predetermined intervals. The digital camera is further provided with an image signal processing circuit 13, a CPU 15, a monitor (LCD) 17, an image memory control circuit 19 and an image memory 21. Each pixel of the image pickup device 11 converts the incident light of an object image thereon into an electrical charge, and the electrical charges are accumulated (integrated). Upon completion of an exposure, the accumulated charges are output, pixel by pixel, as an image signal to the image signal processing circuit 13. The image signal processing circuit 13 performs predetermined adjusting processes such as a white-balance adjusting process and an A/D conversion process on the input image signal to output digital image data to the CPU 15. Namely, image data to which a predetermined process has been performed and converted into digital image data in units of pixels are output to the CPU 15. The CPU 15 converts the image data, which are regularly input to the CPU 15 from the image pickup device 11, into an image signal capable of being indicated on the monitor 17 to visually indicate the image data as an image on the monitor 17 in a through mode (monitoring mode), in which the power is ON in a photographic mode.

When recording an image (image data), the CPU 15 captures an object image based on settings such as an f-number and a shutter speed and converts the input image data into image data having a predetermined format to write this image data into the image memory 21 via the image memory control circuit 19. The digital camera is further provided with an EEPROM 29 serving as a nonvolatile memory which is connected to the CPU 15. A predetermined format, variable data and others are written in the EEPROM 29.

The digital camera is provided with a main switch SWM, a photometering switch SWS, a release switch SWR and a portrait mode switch SWPR which are all connected to the CPU 15. The photometering switch SWS serves as a first switch and the release switch SWR serves as a second switch. The CPU 15 supplies power from a battery (not shown) to various components of the digital camera (i.e., turns the power ON) upon the main switch SWM being turned ON. The CPU 15 carries out an AF (autofocusing) process (contrast AF process), a photometering process upon the photometering switch, i.e., the first switch, being turned ON. The CPU 15 carries out an imaging process upon the release switch SWR, i.e., the second switch, being turned ON. The CPU 15 selects a portrait mode from among selectable exposure modes upon the portrait mode switch SWPR being turned ON. As is known in the art, the photometering switch SWS and the release switch SWR are associated with the release button (not shown) of the digital camera so that the photometering switch SWS is turned ON upon the release button being depressed half way and so that the release switch SWR is turned ON upon the release button being fully depressed.

In the normal contrast AF process, upon the photometering switch SWS being turned ON, the CPU 15 performs a normal focus search process. Specifically, in this focus search process, the CPU 15 captures images consecutively via the image pickup device 11 while moving the focusing lens group L1 stepwise from the closest (shortest) focus position (near extremity/position for bringing an object at the shortest distance in working range into focus) to the infinite focus position (far extremity/position for bringing an object at infinity into focus), or vice versa, via a motor driver 27, an AF motor 25 and a lens drive mechanism 23, stores the captured images in an internal RAM 15a of the CPU 15, and detects the contrasts (contrast values) of the captured images in each focus detection area. Thereafter, a peak contrast value is detected in each focus detection area to detect the position of the focusing lens group L1 at which this peak contrast value is obtained, i.e., an in-focus lens position of the focusing lens group L1 is obtained. Thereupon, the focusing lens group L1 is moved to the in-focus lens position thus obtained. Under normal conditions, the determination of the peak contrast value is made by determining whether or not the contrast value increases a predetermined number of times consecutively, and subsequently decreases a predetermined number of times consecutively. Images captured during a contrast AF process (see FIG. 7) and images captured after an in-focus state is achieved are normally indicated on the monitor 17 in the through mode.

In the present embodiment of the digital camera, two origin sensors 23a and 23b are used to detect the position (lens position) of the focusing lens group L1 in the optical axis direction. Specifically, the closest focus position (near extremity) and the infinite focus position (far extremity) of the focusing lens group L1 are detected by two origin sensors 23a and 23b as two points of origin of the focusing lens group L1, respectively, and the CPU 15 counts the number of drive pulses output from an encoder 26 which operates in association with the AF motor 25 to detect the position of the focusing lens group L1 in the optical axis direction when driving the AF motor 25. The encoder 26 is composed of a photointerrupter or the like which operates in association with movements of the output shaft of the AF motor 25 or a driving part of the lens drive mechanism 23. Although several hundreds of pulses or more are usually necessary for driving the focusing lens group L1 from the closest focus position to the infinite focus position, it is assumed that several pulses or several dozen pulses are only necessary for driving the focusing lens group L1 (while capturing images) in a stepwise manner from the closest focus position to the infinite focus position in the contrast AF process in the present embodiment of the digital camera for the purpose of simplifying the description, and that one step corresponds to one drive pulse and one lens-position pulse.

In addition, in the present embodiment of the digital camera, the position of the focusing lens group L1 is represented by a lens-position pulse number (variable) PN which is incremented by one every time the encoder 26 outputs one pulse (drive pulse) when the AF motor 25 is driven to move the focusing lens group L1 from the closest focus position toward the infinite focus position, and the lens-position pulse number PN is 0 when the focusing lens group L1 is positioned at the closest focus position. In the case where a focus search process in which the focusing lens group L1 is moved from the infinite focus position toward the closest focus position is performed, the lens-position pulse number PN at the infinite focus position of the focusing lens group L1 is set to a maximum value, and the lens-position pulse number PN is decremented by one every time the focusing lens group L1 is driven toward the closest focus position by one drive pulse.

The digital camera is provided therein with a zoom motor 28 for driving the zoom lens L via the lens drive mechanism 23. The focal length of the zoom lens L is detected by an encoder (not shown) incorporated in the lens drive mechanism 23.

Although not shown in detail in the drawings, primary-color filters (red (R), green (G) and blue (B) filters) are disposed in front of each pixel (photoelectric transducing element) on the object side thereof, and each pixel on the light receiving surface transduces the red, green and blue components of the incident rays of object light that are passed through the primary-color filters into electrical charges, and these electrical charges are accumulated. The electrical charges thus accumulated for a predetermined period of time are read out of the image pickup device 11 pixel by pixel to be output as an image signal. This image signal is digitalized and written into the internal RAM (image cache memory) 15a, and is read out therefrom to be used in a face recognition process or a contrast AF process.

The AF process performed in the present embodiment of the digital camera is a contrast detection type AF process, i.e., a contrast AF process. In the contrast AF process, images are captured consecutively at different positions of the focusing lens group L1 while the focusing lens group L1 is being moved stepwise from the closest focus position toward the infinite focus position, or vice versa, to obtain contrast values of image data in each focus detection area at different positions of the focusing lens group L1 in the optical axis direction, respectively. If the contrast value thus obtained increases a predetermined number of times consecutively, and subsequently decreases a predetermined number of times consecutively, the position of the focusing lens group L1 at which a peak contrast value is obtained is determined as an in-focus position of the focusing lens group L1. The contrast AF process is performed by the CPU 15 based on a predetermined program written in an internal ROM 15b of the CPU 15.

Figure 2B:
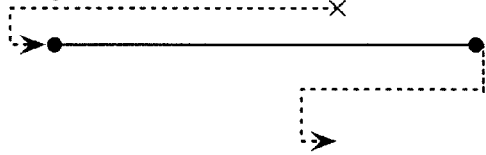
Figure 2C:
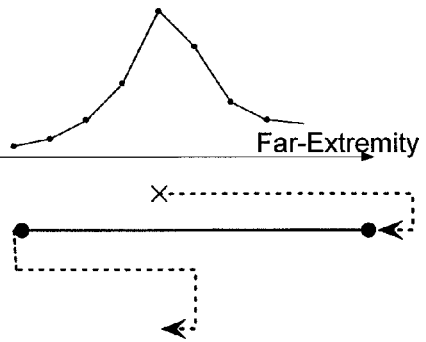
Figure 2D:
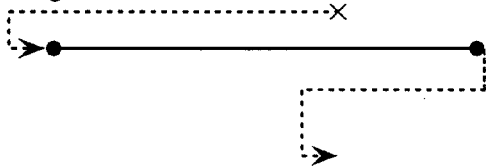

The present embodiment of the digital camera is provided with a multi-point AF mode constituting a multi-point distance measuring mode and a spot AF mode constituting a spot distance measuring mode. In the multi-point distance measuring mode, the focusing lens group L1 is moved to the closest focus position regardless of the current position of the focusing lens group L1, and thereupon, the above described focus search process is performed with the closest focus position of the focusing lens group L1 set as the aforementioned search start position (see FIGS. 2A and 2B). In the spot distance measuring mode, the focusing lens group L1 is moved to the closest focus position if positioned closer to the closest focus position, and the focusing lens group L1 is moved to the infinite focus position if positioned closer to the infinite focus position. Thereupon, the above described focus search process is performed with this focus position (closest focus position/infinite focus position) of the focusing lens group L1 set as the aforementioned search start position (see FIGS. 2C and 2D).

Figure 3A:
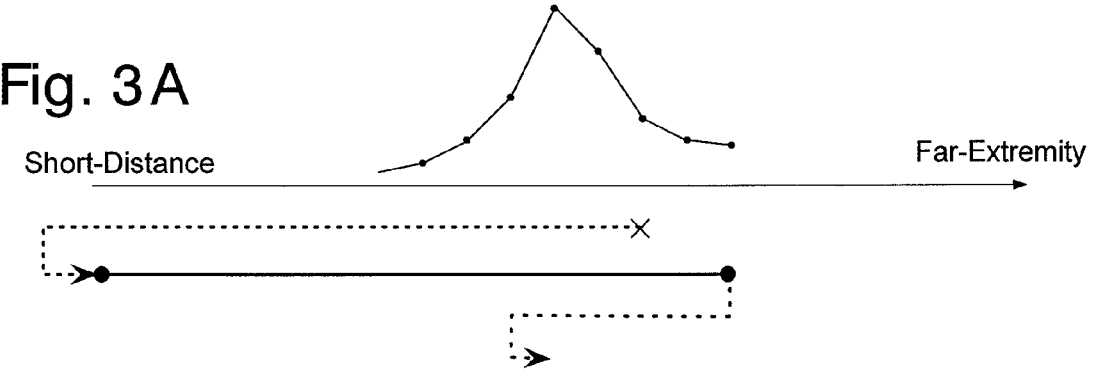
Figure 3B:
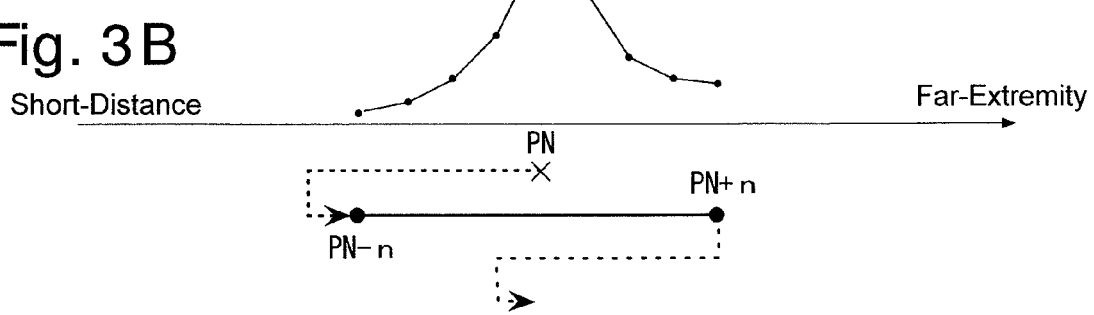

The present embodiment of the digital camera is further provided with a partial AF process (mode) in which the range of movement of the focusing lens group L1 for the focus search process is narrowed as shown in FIG. 3B once focus is achieved by the normal focus search process as shown in FIG. 3A. Specifically, in the partial AF process (mode), the range of movement of the focusing lens group L1 for the focus search process is limited to a narrow moving range which includes the current position of the focusing lens group L1 (see FIG. 3B).

The digital camera has a function (face recognition function) of recognizing a face image by determining whether or not an image signal of a face image is included in an image signal (image data) written into the internal RAM 15a after an object image is captured via the image pickup device 11. In the present embodiment of the digital camera, the CPU 15 performs a face recognition process based on the aforementioned image signal (image data) that is written into the internal RAM 15a of the CPU 15 after an object image is captured via the image pickup device 11. The CPU 15 serves as a face recognition device which reads out image data from the internal RAM 15a based on a predetermined program written in the internal ROM of the CPU 15 to detect areas corresponding to human faces, i.e., to detect face areas. Face detection and the face recognition process are constructed from an algorithm based on a known face/face image recognition method. Namely, in the face detection and the face recognition process, flesh color (skin color) or face feature points (e.g., eye points, nose points and mouth points) are detected or the contours of a person's face are extracted to recognize a face image in the entire image signal captured by the image pickup device 11.

As mentioned above, the aforementioned portrait mode, as an exposure mode of the digital camera, is selected upon the portrait mode switch SWPR being turned ON. When the digital camera is in the portrait mode, the face recognition AF mode is continuously performed as long as the digital camera is in the through mode with the power remaining ON.

In the portrait mode, the digital camera operates in the face recognition AF mode, in which a face image is recognized, an area which includes the recognized face image is set as a focus detection area, and a focus search process is performed on this focus detection area to bring the recognized face image into focus.

Figure 4:
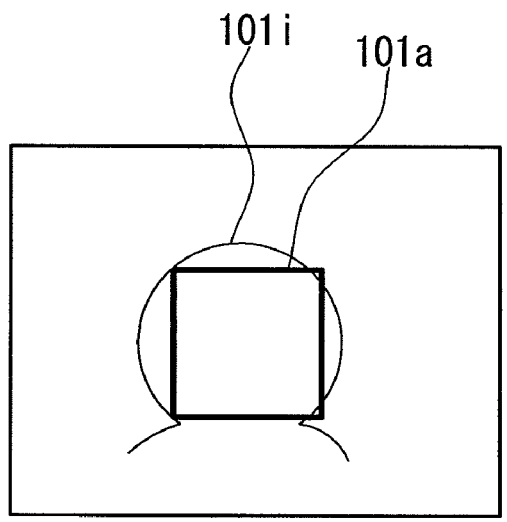
Figure 4:
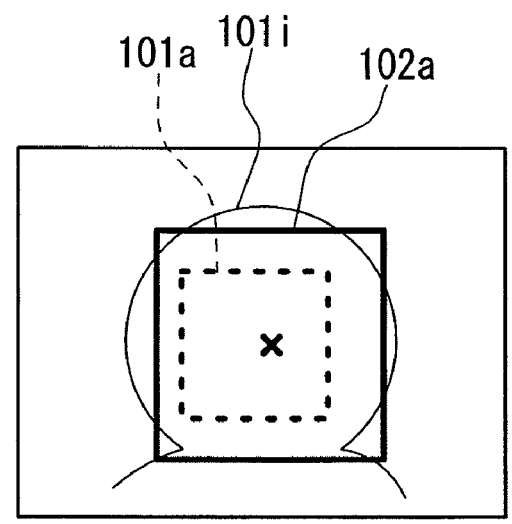
Figure 5:
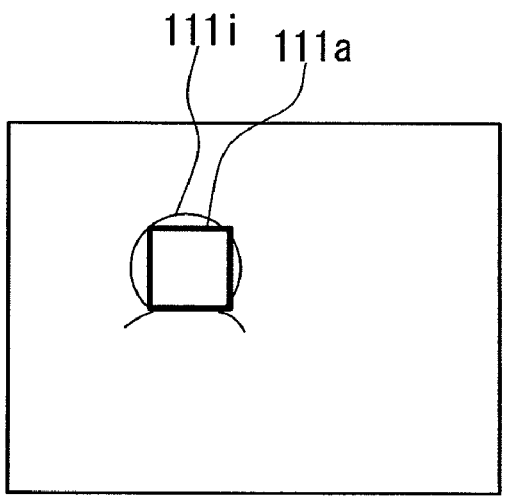
Figure 5:
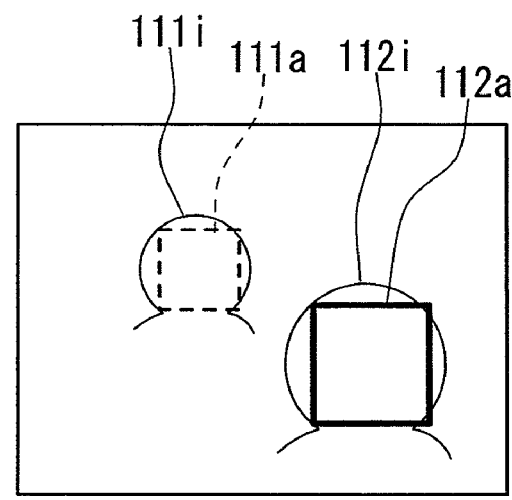

FIGS. 4A and 4B show a manner of setting a focus detection area when a face image is recognized, and FIGS. 5A and 5B show another manner of setting a focus detection area when a face image is recognized. FIG. 4A shows a display on the monitor 17 when a face image 101i is recognized, and FIG. 5A shows a display on the monitor 17 when a face image 111i is recognized. In the case shown in FIG. 4A, upon a face image 101i being recognized, a focus detection area (AF frame) 101a with the center thereof coincident with the center of the face image 101i is set. Similarly, in the case shown in FIG. 5A, upon a face image 111i being recognized, a focus detection area (AF frame) 111a with the center thereof coincident with the center of the face image 111i is set.

FIG. 4B shows an example of a display on the monitor 17 which is shown upon an increase in size of the face image 101i on the monitor 17 (e.g., upon the face approaching the digital camera) subsequent to the state shown in FIG. 4A. In FIG. 4B, the person of the face image 101i as a target object has approached the digital camera so that the face image 101i becomes greater in size on the monitor 17, and a central position x of the face image 101i has moved on the monitor 17. In FIG. 4B, the square shown by a broken line represents the focus detection area 101a, and the square shown by a solid line represents a focus detection area (AF frame) 102a which is set on the face image 101i.

FIG. 5B shows an example of a display on the monitor 17 which is shown upon another face image 112i entering the picture subsequent to the state shown in FIG. 5A. In this case, a focus detection area (AF frame) 112a is set on the face image 112i that is greater in size than the face image 111i.

Upon a face image being recognized, it is desirable that a visual frame which designates the area of the recognized face image or a focus detection area which is set on the recognized face image be superimposed on the image displayed on the monitor 17.

When the digital camera is in the portrait mode, the face recognition AF mode is carried out upon a face image being recognized subsequent to a state where no face image is recognized. In the face recognition AF mode, a focus detection area is set on the recognized face image, the focus search process is performed based on the face image in the set focus detection area, the focusing lens group L1 is stopped at a detected in-focus lens position of the focusing lens group L1, and control waits for the user to give the digital camera a command for commencing a focus adjustment, i.e., waits for the photometering switch SWS that serves as the first switch to be turned ON. Upon more than one face image being recognized, a focus detection area is set on the largest face image among all the recognized face images or the face image closest to the center of the picture plane, which corresponds to the center of the monitor 17.

The face recognition AF process can be started after a lapse of a predetermined period of time from the moment at which a face image is recognized for the first time, or upon a face image becoming stably recognizable, or upon recognizing a face image consecutively at a predetermined number of times in the face recognition process performed at regular intervals.

After the completion of the fame recognition AF process, the AF frame is no longer indicated on the monitor 17.

Upon the digital camera being given a command for commencing a focus adjustment (upon the photometering switch SWS being turned ON) after the completion of the fame recognition AF process, if one or more of the following three conditions (a), (b) and (c) are satisfied, a partial focus search process of the partial AF process (see FIG. 3B) in which the focus search process is performed over a predetermined narrow moving range of the focusing lens group L1 which includes the currently stopped position of the focusing lens group L1. If none of the following conditions (a), (b) and (c) is satisfied, the focus search process is performed without the moving range of the focusing lens group being limited to a narrow moving range.

Figure 9:
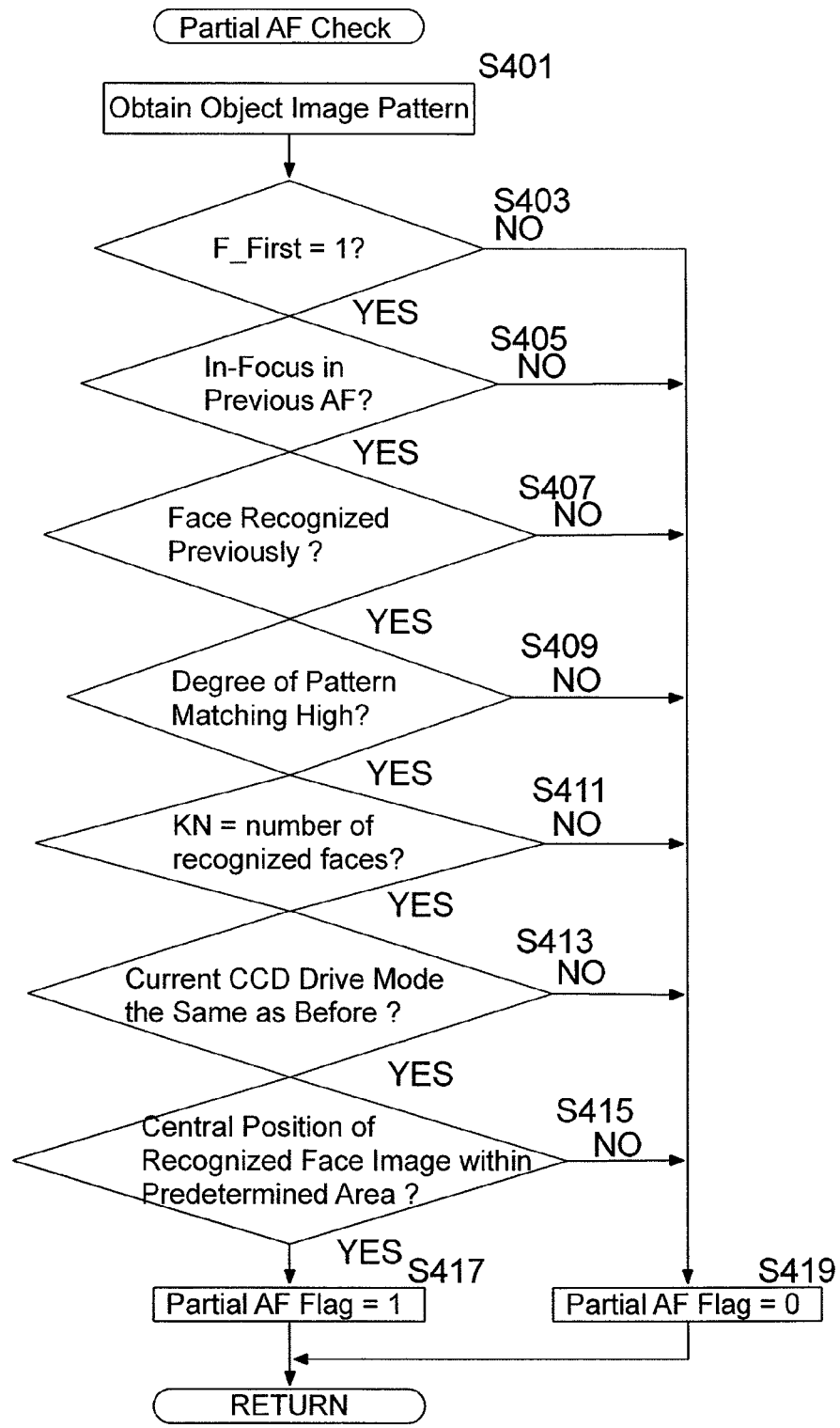
FIG. 9 is a flow chart showing a sub-routine "partial AF check process" performed in the first focus initializing process shown in FIG. 8.

Condition (a) designates a case wherein the number of recognized face images neither increases nor decreases during the period from the completion of the face recognition AF process until the user turns ON the photometering switch SWS (if YES at step S411 shown in FIG. 9).

Condition (b) designates a case wherein the degree of pattern matching between the pattern of the entire image captured immediately after the completion of the face recognition AF process and the pattern of the entire image captured at the moment the photometering switch SWS is turned ON is high (if YES at step S409).

Condition (c) designates a case wherein the size of the face image at the moment the photometering switch SWS is turned ON is within a predetermined range with respect to the size of the face image captured at the face recognition AF process and that the central position of the face image at the moment the photometering switch SWS is turned ON is within a predetermined range with its center coincident with the central position of the face image recognized at the face recognition AF process (if YES at step S415).

If the photometering switch SWS is turned ON during the face recognition AF process, the AF frame is indicated on the monitor 17 after the completion of the AF process performed on the area of the recognized face image, i.e., after the recognized face image is brought into focus, and control enters a photo-standby state in which control waits for the release switch SWR to be turned ON.

In the case where another large face image area shows up during the photo-standby state after the completion of the face recognition AF process, the face recognition AF process can be performed again.

Figure 6:
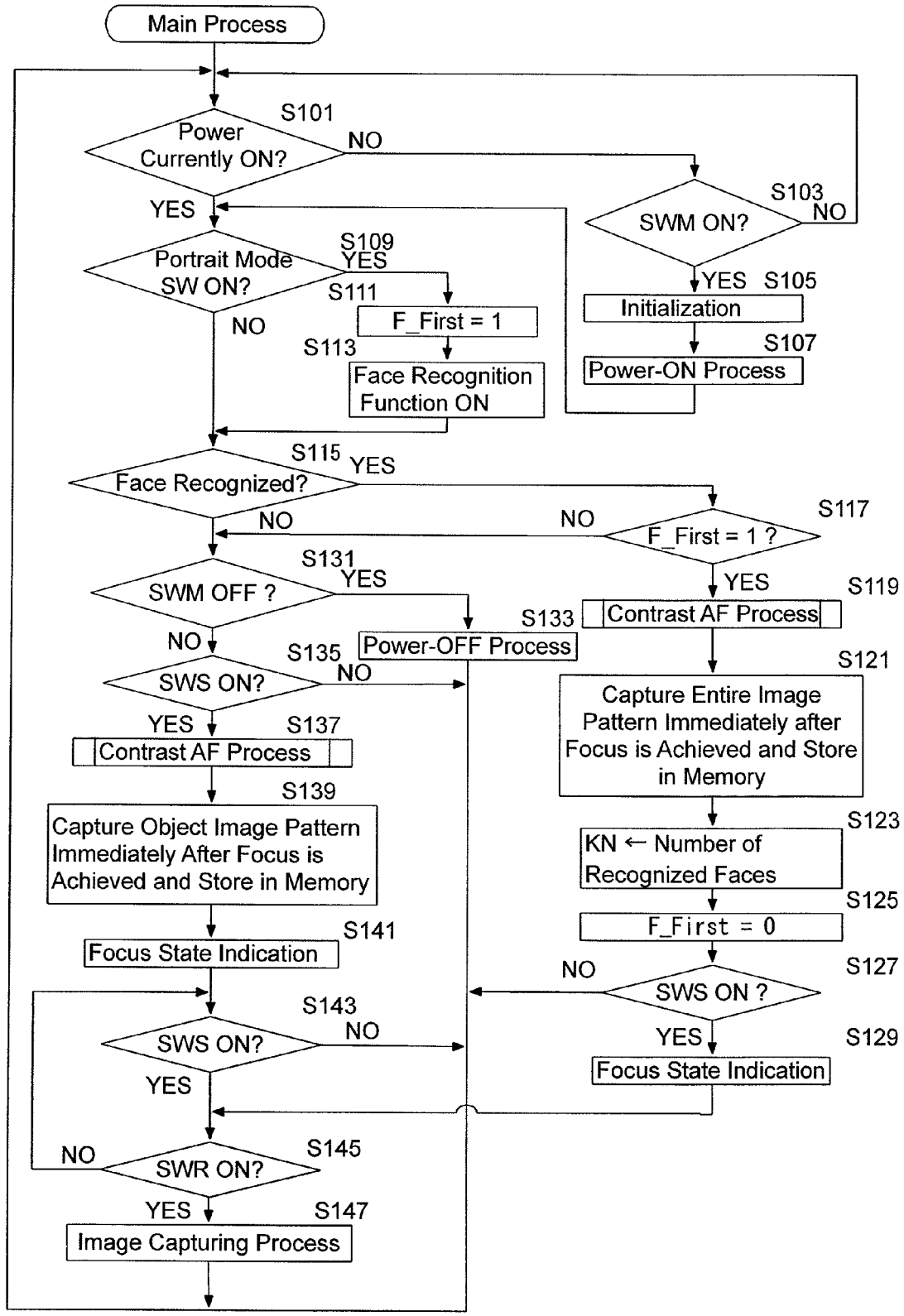
FIG. 6 is a flow chart showing an embodiment of a main process which is performed in the digital camera.

The contrast AF process and the face detection AF process that are carried out in the present embodiment of the digital camera will be discussed in detail with reference to the flow charts shown in FIGS. 6 through 9. FIG. 6 is a flow chart showing an embodiment of a main process having a sequence of operating steps which is performed in this digital camera. Control enters this main process upon a battery (not shown) being loaded into the digital camera.

In the main process, firstly it is determined whether or not the main switch SWM is ON (step S101). If the main switch is not ON (if NO at step S101), it is determined whether or not the main switch SWM is turned ON from the OFF state (step S103). If the main switch SWM remains OFF (if NO at step S103), control returns to step S103. Namely, a process (main-switch check process) of checking the ON/OFF state of the main switch SWM is repeated. If the main switch SWM is turned ON from the OFF state (if YES at step S103), hardware/software initialization (initialization of the internal RAM 15a, ports, variables, etc.,) is performed (step S105), and a power-ON process in which the power is turned ON to supply power to various parts is performed (step S107), and control proceeds to step S109. The hardware/software initialization at step S105 includes an operation clearing an initial flag F_First (i.e., setting the initial flag F_First to 0).

The initial flag F_First is a flag for determining whether or not the portrait mode is currently set and the face recognition process is performed for the first time.

At step S109 it is determined whether or not the portrait mode switch SWPR is ON. If the portrait mode switch SWPR is ON (if YES at step S109), the initial flag F_First is set to 1 (step S111), the face recognition function is turned ON (activated) (step S113), and control proceeds to step S115. If the portrait mode switch SWPR is OFF (if NO at step S109), control simply proceeds to step S115. Upon the face recognition function being turned ON, the face recognition process is performed at a suitable stage.

At step S115 it is determined whether or not at least one face image has been recognized (step S115). If no face image has been recognized (if NO at step S115), control proceeds to step S131. If at least one face image has been recognized (if YES at step S115), it is determined whether or not the initial flag F_First is 1 (step S117). If the initial flag F_First is not 1 (if NO at step S117), control proceeds to step S131. If the initial flag F_First is 1 (if YES at step S117), i.e., if at least one face image is detected for the first time after the portrait mode switch SWPR is turned ON, the contrast AF process is performed (step S119), the pattern of the entire image captured immediately after an in-focus state is obtained (step S121), the number of recognized face images is assigned to a variable KN (step S123), and the initial flag F_First is set to 0 (step S125). Subsequently, it is determined whether or not the photometering switch SWS is ON (step S127). If the photometering switch SWS is not ON (if NO at step S127), control returns to step S101. If the photometering switch SWS is ON (if YES at step S127), a focus state is visually indicated (step S129), and control proceeds to step S145.

At step S131 it is determined whether or not the main switch SWM has switched OFF. If the main switch SWM has switched OFF (if YES at step S131), a power-OFF process is performed (step S133), and control returns to step S101. In this case, since control returns to step S101 in a state where the power is OFF, the operations at steps S101 and S103, which are performed to wait for the main switch SWM to be turned ON, are repeated.

If the main switch SWM has not been switched OFF (if NO at step S131), it is determined whether or not the photometering switch SWS is ON (step S135). If the photometering switch SWS is not ON (if NO at step S135), control returns to step S101. Since control returns to step S101 in a state where the power is ON, it is determined at step S101 that the power is currently ON and control proceeds to step S109. Accordingly, control repeats the operations at steps S101 through S135. Upon the main switch SWM being switched OFF during the time the operations at steps S101 through S135 are repeated (if YES at step S131), a power-OFF process is performed (step S133), and control returns to step S101, so that the operations at steps S101 and S103, which are performed to wait for the main switch SWM to be turned ON, are repeated.

Upon the photometering switch SWS being turned ON during the loop process at steps S101 through S135 (if YES at step S135), the contrast AF process is performed to bring a target object into focus by moving the focusing lens group L1 (step S137). Subsequently, a whole image pattern of an object image (object image pattern) obtained immediately after an in-focus state is obtained on the target object is captured and stored in the image memory 21 (step S139). Subsequently, an AF frame is indicated on the monitor 17 (step S141), and it is determined whether or not the photometering switch SWS is ON (step S143). If the photometering switch SWS is ON (if YES at step S143), it is determined whether or not the release switch SWR is ON (step S145). If the release switch SWR is not ON (if NO at step S145), control returns to step S143 to repeat the operations at steps S143 and S145 to determined whether or not the release switch SWR is ON during the time the photometering switch SWS is ON (if YES at step S143).

Upon the release switch SWR being turned ON (if YES at step S145), an image capturing process is performed (step S145), and control returns to step S101. If the photometering switch SWS is turned OFF (if NO at step S143), control simply returns to step S101.

Figure 7:
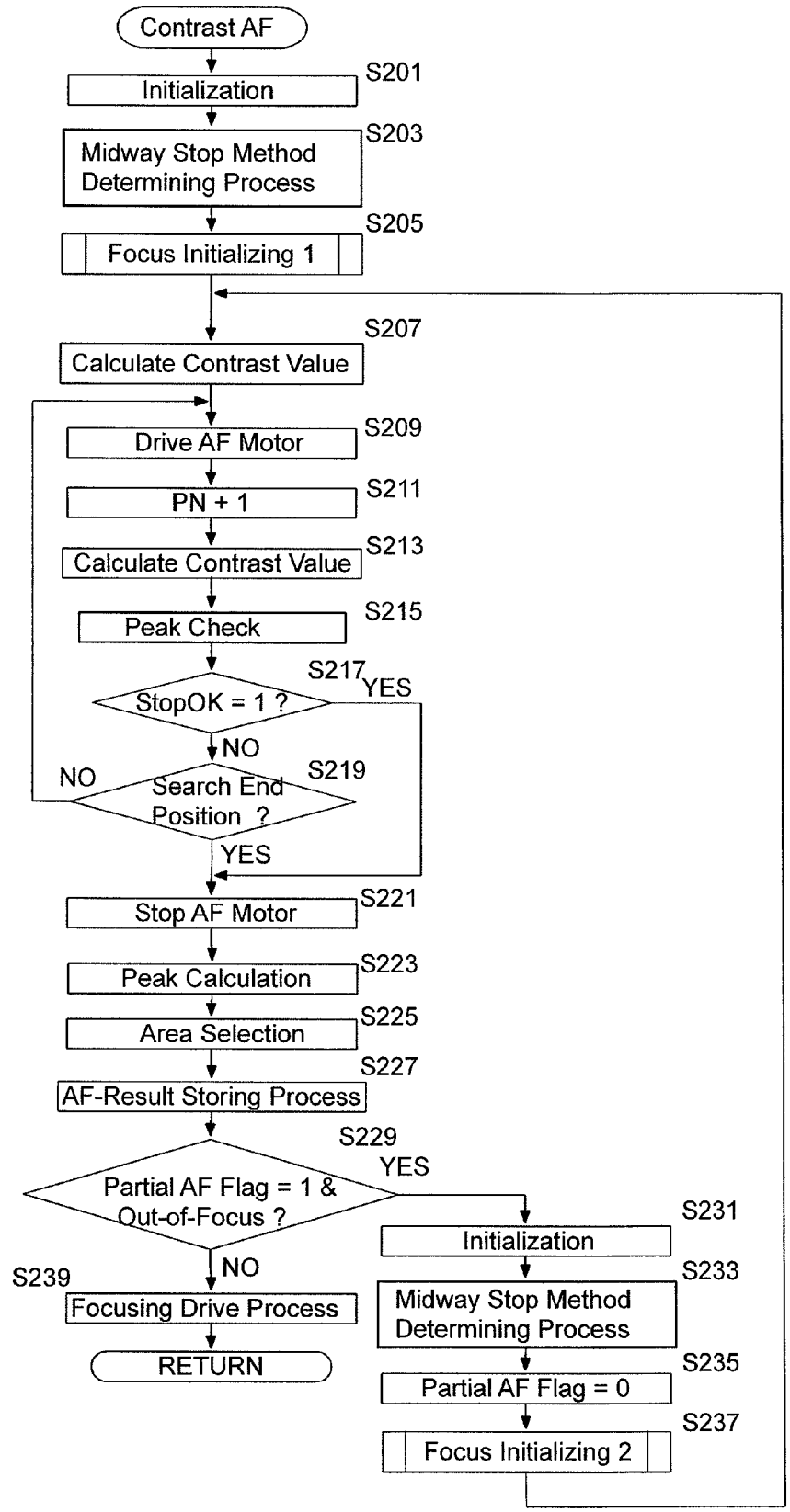
FIG. 7 is a flow chart showing a sub-routine "contrast AF process" performed in the main process shown in FIG. 6.

The contrast AF process that is performed at steps S119 and S137 will be hereinafter discussed in detail with reference further to the flow chat shown in FIG. 7.

In the contrast AF process, firstly various variables, etc., are initialized (step S201). For instance, in this particular embodiment, each status (flag) is cleared (i.e., set to 0), contrast values are cleared, a lens-position pulse number PN is initialized (PN=0), the maximum contrast value is set to 0, the minimum contrast value is set to FFFFFFFF, a midway-stop identification flag is cleared, a midway-stop OK flag is cleared, and the number of focus detection areas is set according to the focal length. Additionally, in this particular embodiment, when face images such as the face images 101$i$ and 111$i$ are recognized, focus detection areas 101$a$ and 111$a$ which include areas of the recognized face images are set as focus detection areas.

Variables and others are defined as follows.

Contrast values are those actually obtained from pixels in each focus detection area.

Given that the lens-position pulse number PN is 0 when the focusing lens group L1 is positioned at the closest focus position, that serves as the initial position of the focusing lens group L1, the lens-position pulse number PN is a variable which is incremented by one by the CPU 15 every time the encoder 26 outputs one pulse (drive pulse) when the AF motor 25 is driven in the direction toward the infinite focus position. When the AF motor 25 is driven to move the focusing lens group L1 in the direction toward the initial position thereof, the lens-position pulse number PN is decremented by one by the CPU 15 every time the encoder 26 outputs one pulse (drive pulse).

The maximum contrast value and the minimum contrast value are variables to which actually-obtained maximum and minimum contrast values are assigned, respectively.

The midway-stop OK flag (StopOK flag) is a flag which enables or disables the focus search process. Specifically, the midway-stop OK flags 0 and 1 disable and enable the focus search process, respectively.

A partial AF flag (F_PartialAF) is a flag for determining whether or not to perform the partial focus search process, i.e., whether or not to perform the focus search process partially over the range from the closest focus position to the infinite focus position. Specifically, the partial AF flags 0 and 1 indicate not to perform and to perform the focus search process partially over the range from the closest focus position to the infinite focus position, respectively.

After the completion of the above described initializing process at step S201, a midway stop method determining process is performed (step S203). Namely, it is determined whether or not the focus search process is terminated upon a peak contrast occurring (i.e., whether or not the focus search process is performed up to a search end position at which the focus search process is terminated). A condition for determining the way to stop the focus search process can be either the object brightness or a CCD drive mode of the image pickup device 11 that operates in association with the object brightness, and the midway-stop OK flag (StopOK flag) is set to 1 to stop the focus search process before the focusing lens group L1 reaches the search end position if the object brightness is greater than a predetermined brightness.

Subsequently, a first focus initializing process (see FIG. 8) is performed (step S205). In the first focus initializing process, a partial AF check process (see FIG. 9) is performed to determine whether or not to perform the partial focus search process, and the focusing lens group L1 is moved to a search start position thereof which is determined according to the current focus position (lens position) of the focusing lens group L1 and the currently-set AF mode (multi-point distance measuring mode or spot distance measuring mode).

In the case where predetermined conditions are satisfied in the contrast AF process performed for the second time or more, the partial AF flag is set to 1. In this case, the focusing lens group L1 is moved to an initial position thereof for the partial AF check process (i.e., the position away from the current stop position of the focusing lens group toward the closest focus position by an amount of movement corresponding to the number of pulses n), and the infinite focus position is set at a position away from the current stop position of the focusing lens group L1 toward the infinite focus position by an amount of movement corresponding to the number of pulses n, as a search end position at which the focus search process is terminated. The number of pulses n is set to be greater than m (n>m) in the case where the determination of the peak contrast value is made by determining whether or not the contrast value increases a first predetermined number of times m consecutively, and subsequently decreases a second predetermined number of times m consecutively. The number of pulses n is normally set to the number of times m plus 1 or 2 (n=m+1, or n=m+2). Namely, the range of movement of the focusing lens group L1 for the partial focus search process is determined to include at least a range of movement of the focusing lens group L1 in which at least the current position of the focusing lens group L1 can be determined as an in-focus position.

Subsequently, image data at the search start position of the focusing lens group L1 in the focus search process is captured, and thereupon a contrast value calculating process is performed (step S207). Namely, based on the image data input from the image pickup device 11, the contrast value P[0] at the initial position of the focusing lens group L1 is calculated, and the maximum contrast value Max and the minimum contrast value Min are updated. Subsequently, the AF motor 25 is driven by one step in the direction to move the focusing lens group L1 toward the search end position (step S209), and the lens-position pulse number PN is incremented by one (step S211).

Subsequently, a contrast value calculating process is performed (step S213). In the contrast value calculating process, a contrast value P[PN] is calculated in accordance with image data input from the image pickup device 11, and the maximum contrast value and the minimum contrast value are updated.

Subsequently, a peak check process is performed which determines whether or not the contrast value P[PN] calculated at step S213 is a peak contrast value which satisfies preset conditions (step S215). The contrast value calculating process at step S213 and the peak check process at step S215 are performed on all the focus detection areas selected at step S201.

Subsequently, it is determined whether or not the midway-stop OK flag (StopOK flag) is 1 (step S217). If the midway-stop OK flag is not 1 (if NO at step S217), it is determined whether or not the focusing lens group L1 has reached the search end position thereof (step S219). If the focusing lens group L1 has not reached the search end position thereof (if NO at step S219), control returns to step S209, so that the operations at steps S209 through S219 are repeated while the focusing lens group L1 is moved stepwise toward the search end position.

If the midway-stop OK flag is 1 (if YES at step S217) or if the focusing lens group L1 has reached the search end position thereof (if YES at step S219), the AF motor 25 is stopped (step S221). Subsequently, a peak calculation process for calculating a peak contrast value (by linear approximation) is performed in accordance with five contrast values at consecutive five lens positions which are obtained in the loop process at steps S207 through S219 (step S223). Namely, an estimated more-precise peak contrast value and the position thereof are calculated by linear approximation because there is a possibility of a real peak contrast value existing in the close vicinity of a peak contrast value among the contrast values respectively calculated at the stepping positions.

Subsequently, an area selection process is performed at step S225. In the area selection process, one of the focus detection areas, in which a value at the closest distance is obtained in accordance with the peak contrast value obtained at each focus detection area, is selected as an in-focus area in the multi-point distance measuring mode. Subsequently, an AF-result storing process, upon an AF result (in-focus or out-of-focus) being obtained, is performed in which the CCD drive mode and the exposure time are stored (step S227).

Thereafter, it is determined whether or not the partial AF flag is 1 and the focus state is an out-of-focus state (step S229). If the partial AF flag is not 1 or the focus state is not an out-of-focus state (if NO at step S229; i.e., if the partial AF flag is 1 and the focus state is an in-focus state, or if the partial AF flag is not 1 regardless of the focus state), a focusing drive process in which the focusing lens group L1 is moved to the lens position thereof, at which a peak contrast value is obtained in the aforementioned selected in-focus area regardless of whether the focus state is an in-focus state or an out-of-focus state, is performed (step S239). Thereafter, control returns to the main process.

If the partial AF flag is 1 and the focus state is an out-of-focus state (if YES at step S229), an initialization process similar to the initialization process performed at step S201 is performed (step S231), a midway stop method determining process similar to the midway stop method determining process performed at step S203 is performed (step S233), the partial AF flag is set to 0 (step S235), a second focus initializing process (see FIG. 8) is performed (step S237), and control returns to step S207. The second focus initializing process is identical to the first focus initializing process except that the partial AF check process that is performed at step S301 in the first focus initializing process is not performed in the second focus initializing process. Namely, if the focus state is an out-of-focus state as a result of performing the partial focus search process, the normal focus search process, i.e., a focus search process over the entire focusing range, is performed. If an in-focus state is not obtained even if the normal focus search process is performed, the focusing lens group L1 is moved to, e.g., a hyperfocal-distance setting position, at which the maximum depth of field on the photographing lens L is obtained, before control returns to the main process after the completion of the contrast AF process.

[First and Second Focus Initializing Processes]

Figure 8:
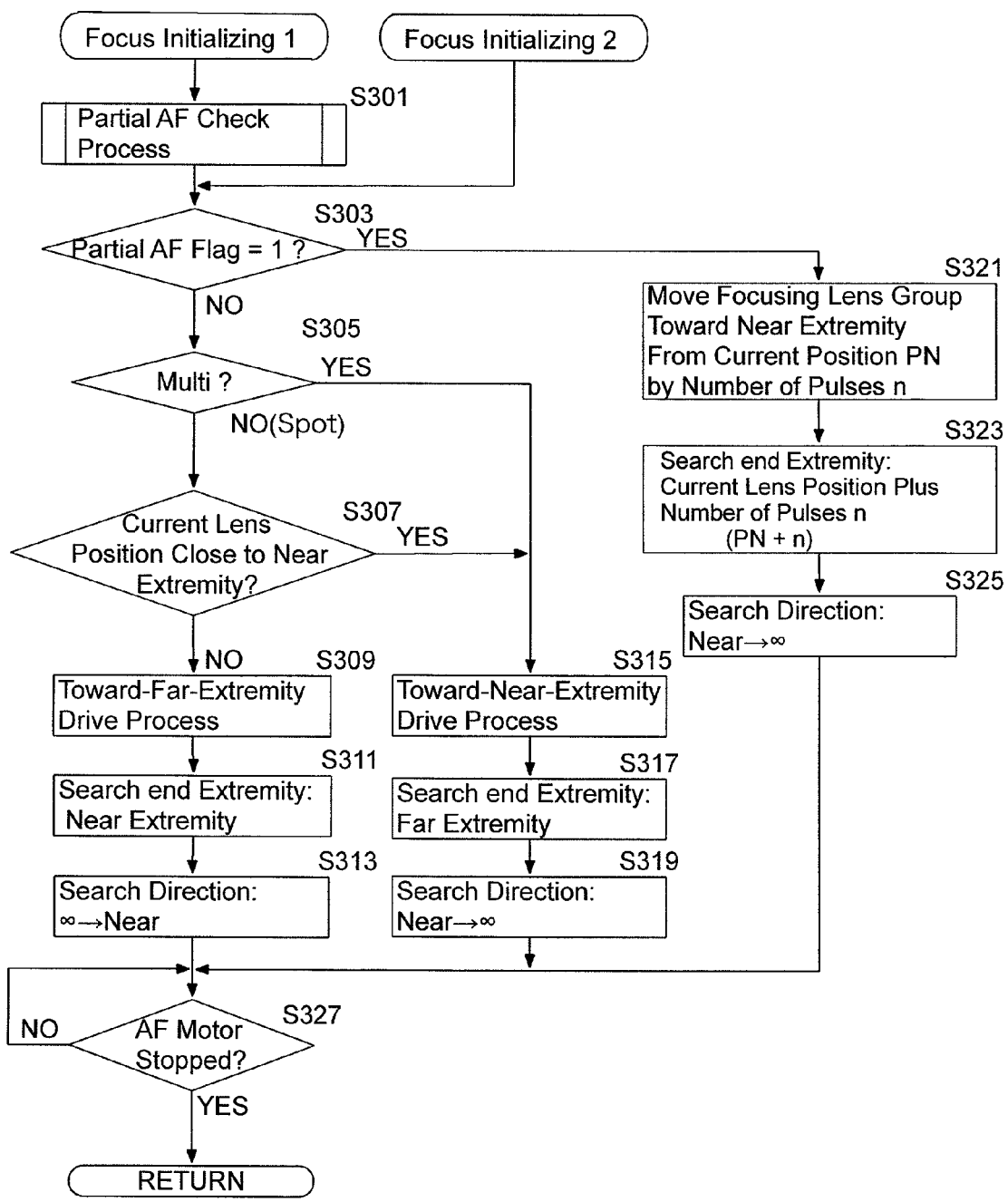
FIG. 8 shows a flow chart having a sub-routine "first focus initializing process" and a sub-routine "second focus initializing process", each of which is performed in the contrast AF process shown in FIG. 7.

The first focus initializing process and the second focus initializing process that are respectively performed at step S205 and S237 in the contrast AF process will be discussed in detail with reference to the flow chart shown in FIG. 8. The difference between the first and second focus initializing processes is in that the partial AF check process that is performed at step S301 in the first focus initializing process is not performed in the second focus initializing process.

In the first focus initializing process, firstly the partial AF check process (see FIG. 9) is performed (step S301). If predetermined conditions are satisfied, the partial AF flag is set to 1 in the partial AF check process, so that the range of movement of the focusing lens group L1 for the focus search process is limited to a narrow moving range.

Subsequently, it is determined whether or not the partial AF flag is 1 (step S303). If the partial AF flag is 1 (if YES at step S303), a lens drive process in which the focusing lens group L1 is moved toward the closest focus position from the current position thereof (PN) by an amount of movement corresponding to the number of pulses n is performed (step S321), the lens position which corresponds to the current lens position of the focusing lens group L1 plus the amount of movement corresponding to the number of pulses n is set as the search end position of the focusing lens group L1 (step S323), the direction of the focus search process is set to the direction from the closest focus position toward the infinite focus position (step S325), and control proceeds to step S327. At step S327, it is determined whether or not the AF motor 25 has been driven to move the focusing lens group L1 toward the closest focus position by the amount of movement corresponding to the number of pulses n and thereupon the AF motor 25 has been stopped. Upon the AF motor 25 being stopped (if YES at step S327), control returns.

The AF-motor driving operation performed in the operation at step S321, in which the AF motor 25 is driven to move the focusing lens group L1, is controlled by an interrupt process (not shown). The position of the focusing lens group L1 upon the completion of the operation at step S321 becomes, e.g., the same as the lens position represented by the lens-position pulse number (PN−n) in the case of the embodiment shown in FIG. 5B. Thereafter, in the partial focus search process, the focus search process is performed in the direction toward the infinite focus position, with this lens position of the lens-position pulse number (PN−n) being a search start position, until the lens position of the lens-position pulse number (PN+n).

If the partial AF flag is not 1 (if NO at step S303), the operations at steps S305 through S319 are performed. Specifically, firstly it is determined whether or not the currently-set distance measuring mode is the multi-point distance measuring mode (step S305). If the currently-set distance measuring mode is the multi-point distance measuring mode (if YES at step S305), a toward-near-extremity drive process is performed (step S315). In the toward-near-extremity drive process, the AF motor 25 is driven in the direction toward the closest focus position to move the focusing lens group L1 to the closest focus position (near extremity). Subsequently, the infinite focus position is set as the search end position of the focusing lens group L1 (step S317), the direction of the focus search process is set to the direction from the closest focus position toward the infinite focus position (step S319), and control proceeds to step S327.

If the currently-set distance measuring mode is not the multi-point distance measuring mode (if NO at step S305), i.e., if the currently-set distance measuring mode is in the spot distance measuring mode, it is determined whether or not the current position of the focusing lens group L1 is in the vicinity of the closest focus position (step S307). If the current position of the focusing lens group L1 is in the vicinity of the closest focus position (if YES at step S307), the toward-near-extremity drive process is performed (step S315), the infinite focus position is set as the search end position of the focusing lens group L1 (step S317), the direction of the focus search process is set to the direction from the closest focus position toward the infinite focus position (step S319), and control proceeds to step S327. If the current position of the focusing lens group L1 is not in the vicinity of the closest focus position (if NO at step S307), a toward-far-extremity drive process is performed (step S309). In the toward-far-extremity drive process, the AF motor 25 is driven in the direction toward the infinite focus position to move the focusing lens group L1 to the infinite focus position (far extremity). Subsequently, the closest focus position is set as the search end position of the focusing lens group L1 (step S311), the direction of the focus search process is set to the direction from the infinite focus position toward the closest focus position (step S313), and control proceeds to step S327.

The operations at step S309 and S315 are controlled by an interrupt process (not shown). Thereafter, if the focusing lens group L1 has reached the closest focus position or the infinite focus position and thereupon, the AF motor 25 is stopped, and control returns (step S327, YES; RETURN).

With the above described first and second focus initializing processes, the focusing lens group L1 is moved from the current position thereof toward the closest focus position by an amount of movement corresponding to the number of pulses n when the partial focus search process is performed. When the partial focus search process is not performed, the focusing lens group L1 is moved to the closest focus position regardless of the current position of the focusing lens group L1 in the multi-point distance measuring mode, or moved to the closest focus position and the infinite focus position when the current position of the focusing lens group L1 is in the vicinity of the closest focus position and the infinite focus position, respectively, in the spot distance measuring mode. Thereafter, the position of the focusing lens group L1 after it has been thus moved is designated as the initial position (search start position) of the focusing lens group L1, and the focus search process in which the focusing lens group L1 is moved toward the set search end position is performed.

[Partial AF Check Process]

The partial AF check process that is performed at step S301 will be hereinafter discussed in detail with reference to the flow chart shown in FIG. 9. The partial AF check process is performed to determine whether the partial focus search process or the normal focus search process (full-range focus search process) is to be performed.

In this particular embodiment, it is determined whether or not the initial flag F_First is 1 (step S403), whether or not an in-focus state has been obtained in the previous contrast AF process (step S405), whether or not a face image has been recognized in the previous face recognition process (step S407), whether or not the stored whole image pattern is compared with the current whole image pattern to determine whether or not the degree of pattern matching therebetween is high (the above described condition (b)) (step S409), whether or not the number of currently recognized face images is equal to the variable KN (the above described condition (a)) (step S411), whether or not the current CCD drive mode (CCD high-speed drive mode or CCD low-speed drive mode) is the same as the previous CCD drive mode (step S413), and whether or not the central position of the recognized face image is within a predetermined area (step S415). The partial focus search process is performed if all the conditions at steps S403 through S415 are affirmative (if YES at each of all the steps S403 through S415).

In the partial AF check process, firstly an image capturing process is performed by the image pickup device 11 to obtain the pattern of an entire image (step S401). This pattern can be obtained by, e.g., binarizing all the input image data with a predetermined threshold value.

Subsequently, it is determined whether or not the initial flag F_First is 1 (step S403). If the initial flag F_First is not 1 (if NO at step S403), this means that the current contrast AF process is the contrast AF process performed for the second time or more, so that the partial AF flag F_PartialAF is set to 0 (step S419), and control returns.

If the initial flag F_First is 1 (if YES at step S403), this means that the current contrast AF process is the contrast AF process performed for the first time, so that it is determined whether or not an in-focus state has been obtained in the previous contrast AF process (step S405). If no in-focus state was obtained in the previous contrast AF process (if NO at step S405), it is not necessary to newly search an object which is to be focused, so that the partial AF flag F_PartialAF is set to 0 (step S419) and control returns.

If an in-focus state has been obtained in the previous contrast AF process (if YES at step S405), it is determined whether or not a face image has been recognized in the previous face recognition process also (step S407). If no face image was recognized in the previous face recognition process (if NO at step S407), no face which is to be followed exits, so that the partial AF flag F_PartialAF is set to 0 (step S419), and control returns.

If a face image has been recognized in the previous face recognition process also (if YES at step S407), whether or not the stored whole image pattern (that is stored at step S121 or S139) is compared with the current whole image pattern to determine whether or not the degree of pattern matching therebetween is high (step S409). In this determination, for instance, each of the stored whole image pattern and the current whole image pattern is binarized, these two binarized data are compared with each other in units of pixels, and it is determined that the degree of pattern matching is high if the percentage of pixel matching, e.g., the percentage of matched pixels between the binarized data on the current whole image pattern and the binarized data on the stored whole image pattern is equal to or greater than 80 percent. If the degree of pattern matching is not high (if NO at step S409), there is a possibility of composition having been changed, so that the partial AF flag F_PartialAF is set to 0 (step S419), and control returns.

If the degree of pattern matching is high (if YES at step S409), it is determined whether or not the variable KN is equal to the number of currently recognized face images, i.e., whether or not the number of previously recognized face images KN and the number of currently recognized face images are the same (step S411). If these numbers are not the same, e.g., if contrast values change from the state shown in FIG. 3A to the state shown in FIG. 3B, or vice versa, there is a possibility of a target object or composition having been changed, so that the partial AF flag F_PartialAF is set to 0 (step S419), and control returns.

If the number of previously recognized face images KN and the number of currently recognized face images are the same (if YES at step S411), it is determined whether or not the current CCD drive mode is the same as the previous CCD drive mode (step S413). If these numbers are not the same (if NO at step S413), the partial AF flag F_PartialAF is set to 0 (step S419), and control returns. The CCD drive mode changes when the object brightness changes largely, and accordingly, a target object or composition may have changed. Instead of determining whether or not the current CCD drive mode is the same as the previous CCD drive mode, it is possible to determine whether or not the variation in object brightness is smaller than a predetermined value or determine whether or not the object brightness has changed between a low-brightness region and a high-brightness region. Namely, the case where the variation in object brightness is great or the object brightness has changed between a low-brightness region and a high-brightness region corresponds to the case where the current CCD drive mode is not the same as the previous CCD drive mode (the case when NO at step S413). Therefore, if the variation is small or the brightness region has changed (if YES at step S413), the partial focus search process is performed if the other conditions are satisfied.

If the current CCD drive mode is the same as the previous CCD drive mode (if YES at step S413), whether or not the central position of the recognized face image is within a predetermined area (step S415). If the central position of the recognized face image is out of the predetermined area (if NO at step S415), the partial AF flag F_PartialAF is set to 0 (step S419), and control returns. This is because composition may have been changed by, e.g., a large movement of a person (target object).

If the central position x is within a predetermined area (if YES at step S415), namely, if all the above described conditions at steps S405 through S415 are affirmative (if YES at steps 405, S407, S409, S411, S413 and S415), the partial AF flag F_PartialAF is set to 1 (step S417), and control returns.

As described above, according to the present embodiment of the camera having an autofocusing system, upon recognition of a face image in the portrait mode, the focus search process and the focusing operation are performed on the recognized face image even if the photometering switch SWS is OFF, and subsequently, control waits for the photometering switch SWS and the release switch SWR to be turned ON in the state where the recognized face image is in focus, and thereafter, the focus search process and the focusing operation are performed in the partial focus search process upon the photometering switch SWS being turned ON. Therefore, the time required for the partial AF search process is short, and the face image can be focused and captured precisely in a short period of time with less chance of missing out on a photographic opportunity.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An autofocus camera having a face recognition function, comprising:
    a photographing optical system including a focusing lens group movable along an optical axis;
    an image pickup device;
    an autofocusing system which performs a focus search process in which said image pickup device is activated to capture an object image at each of a plurality of different positions of said focusing lens group in an optical axis direction while said focusing lens group is moved along said optical axis to detect a position of said focusing lens group in the optical axis direction as an in-focus position based on object images obtained at said plurality of different positions of said focusing lens group in at least one focus detection area, and further performs a focusing operation in which said focusing lens group is moved to said in-focus position that is detected by said focus search process;
    an autofocus switch which activates said autofocusing system upon said autofocus switch being turned ON;
    a face recognition device for recognizing a face image based on the object images; and
    a controller which controls said autofocusing system to set said focus at said at least one detection area on a face recognition area at which said face image is recognized by said face recognition device and controls said autofocusing system to perform said focus search process and said focusing operation on said at least one focus detection area regardless of whether said autofocus switch is turned ON, upon one of a lapse of a predetermined period of time after said face recognition device recognizes said face image and said face recognition device consecutively recognizes said face image a predetermined number of times, when said face recognition device recognizes said face image.

2. The autofocus camera according to claim 1, further comprising a portrait mode as one of plural selectable exposure modes of said autofocus camera,
    wherein, after said portrait mode is selected, said controller controls said autofocusing system to set said focus detection area on said face recognition area and controls said autofocusing system to perform said focus search process and said focusing operation on said focus detection area regardless of whether said autofocus switch is turned ON upon one of a lapse of a predetermined period of time after said face recognition device recognizes said face image and said face recognition device consecutively recognizing said face image a predetermined number of times.

3. The autofocus camera according to claim 1, wherein said controller limits a range of movement of said focusing lens group in said focus search process from one to the other of a near extremity and a far extremity to a narrow range including a current position of said focusing lens group, upon said autofocus switch being turned ON after said autofocusing system performs said focus search process and said focusing operation, following recognition of said face image by said face recognition device.

4. The autofocus camera according to claim 3, wherein said controller does not limit said range of movement of said focusing lens group in said focus search process to said narrow range when said autofocusing system performs said focus search process and said focusing operation following said recognition of said face image by said face recognition device.

5. The autofocus camera according to claim 3, wherein, when said focusing lens group has not been previously moved to said in-focus position when said autofocus switch is turned ON, said controller does not limit said range of movement of said focusing lens group in said focus search process to said narrow range.

6. The autofocus camera according to claim 3, wherein, when said face recognition device has not previously recognized said face image when said autofocus switch is turned ON, said controller does not limit said range of movement of said focusing lens group in said focus search process to said narrow range.

7. The autofocus camera according to claim 3, further comprising a memory in which image data on said object image that is captured by said image pickup device is stored,
wherein said controller stores said image data in said memory after said autofocusing system moves said focusing lens group to said in-focus position following said recognition of said face image by said face recognition device, and
wherein, upon said autofocus switch being turned ON afterwards, said controller compares said image data currently captured by said image pickup device with said image data stored in said memory and does not limit said range of movement of said focusing lens group in said focus search process to said narrow range if a degree of matching between said current image data and said image data stored in said memory is lower than a predetermined degree.

8. The autofocus camera according to claim 7, wherein said image data, which is stored in said memory, comprises the pattern of an entire image based on said image data, and wherein said controller compares said pattern of said entire image based on said image data currently captured by said image pickup device with said pattern of said entire image stored in said memory.

9. The autofocus camera according to claim 3, wherein said controller does not limit said range of movement of said focusing lens group in said focus search process to said narrow range if a number of face images recognized by said face recognition device is unequal to a number of face images recognized before said autofocus switch is turned ON, when said switch is turned ON.

10. The autofocus camera according to claim 3, wherein said controller does not limit said range of movement of said focusing lens group in said focus search process to said narrow range if a difference between a current object brightness and an object brightness at a last previous operation of said autofocusing system is greater than a predetermined value when said autofocus switch is operated.

11. The autofocus camera according to claim 3, wherein said controller does not limit said range of movement of said focusing lens group in said focus search process to said narrow range if a central position of said face image recognized by said face recognition device upon said autofocus switch being turned ON is within a predetermined range with a center thereof coincident with a central position of a current face image recognized by said face recognition device.

12. The autofocus camera according to claim 1, further comprising a second switch which is turned ON after said autofocus switch is turned ON,
wherein, upon said second switch being turned ON, said image pickup device is activated to capture said object image at each of said plurality of different positions of said focusing lens group, and the captured image data on said object images is stored in an image memory.

13. The autofocus camera according to claim 1, wherein said autofocus switch is turned ON upon a release button of said autofocus camera being depressed half way.

14. The autofocus camera according to claim 12, wherein said autofocus switch and said second switch are turned ON upon a release button of said autofocus camera being half way depressed and fully depressed, respectively.

15. The autofocus camera according to claim 1, wherein said focusing lens group is moved along said optical axis from one to the other of a near extremity and a far extremity in said focus search process.

16. The autofocus camera according to claim 1, further comprising a power switch.

17. The autofocus camera according to claim 1, further comprising a memory in which image data regarding said object image that is captured by said image pickup device is stored, said controller storing said image data in said memory after said autofocusing system moves said focusing lens group to said in-focus position following recognition of said face image by said face recognition device.

18. The autofocus camera according to claim 1, said focusing lens group being moved along the optical axis, from one to the other of a near extremity and a far extremity during said focus search process, and being movable along the optical axis within a sub-range less than from one to the other of the near extremity and the far extremity in response to the satisfaction of a predetermined condition.

19. The autofocus camera according to claim 1, further including a selectable portrait mode, said face recognition device being operated to recognize the face image when said autofocus camera is in the portrait mode.

20. An autofocus camera having a face recognition function, comprising:
a photographing optical system including a focusing lens group movable along an optical axis;
an image pickup device;
an autofocusing system which performs a focus search process in which said image pickup device is activated to capture an object image at each of a plurality of different positions of said focusing lens group in an optical axis direction while said focusing lens group is moved along said optical axis to detect a position of said focusing lens group in the optical axis direction as an in-focus position based on object images obtained at said plurality of different positions of said focusing lens group in at least one focus detection area, and further performs a focusing operation in which said focusing lens group is moved to said in-focus position that is detected by said focus search process;
an autofocus switch which activates said autofocusing system upon said autofocus switch being turned ON;
a face recognition device for recognizing a face image based on the object images; and
a controller which controls said autofocusing system to set said focus at said at least one detection area on a face recognition area at which said face image is recognized by said face recognition device and controls said autofocusing system to perform said focus search process and said focusing operation on said at least one focus detection area regardless of whether said autofocus switch is turned ON, and limits a range of movement of said focusing lens group in said focus search process from one to the other of a near extremity and a far extremity to a narrow range including a current position of said focusing lens group, upon said autofocus switch being turned ON after said autofocusing system performs said focus search process and said focusing operation, following recognition of said face image by said face recognition device.

* * * * *